United States Patent
Daraio et al.

(10) Patent No.: US 8,616,328 B2
(45) Date of Patent: Dec. 31, 2013

(54) METHOD AND APPARATUS FOR WAVE GENERATION AND DETECTION USING TENSEGRITY STRUCTURES

(71) Applicant: California Institue of Technology, Pasadena, CA (US)

(72) Inventors: Chiara Daraio, Pasadena, CA (US); Fernando Fraternali, Avellino (IT)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/772,904

(22) Filed: Feb. 21, 2013

(65) Prior Publication Data
US 2013/0220729 A1    Aug. 29, 2013

Related U.S. Application Data

(60) Provisional application No. 61/603,824, filed on Feb. 27, 2012.

(51) Int. Cl.
| | |
|---|---|
| G10K 15/00 | (2006.01) |
| G10K 11/00 | (2006.01) |
| E04H 12/00 | (2006.01) |
| E04H 12/18 | (2006.01) |
| E04H 15/00 | (2006.01) |
| E04B 1/32 | (2006.01) |
| E04B 7/08 | (2006.01) |
| E04B 7/10 | (2006.01) |
| H01Q 15/20 | (2006.01) |
| H01S 3/10 | (2006.01) |
| G10D 13/08 | (2006.01) |

(52) U.S. Cl.
USPC .............. 181/175; 52/80.1; 52/80.2; 52/81.1; 52/81.2; 52/81.4; 52/108; 52/645; 52/646; 52/648.1; 52/653.1; 84/402; 135/120.4; 181/296; 343/912; 343/915; 372/22

(58) Field of Classification Search
USPC .................. 181/175, 296; 52/645, 108, 80.1; 343/912; 372/22; 84/402, 404
See application file for complete search history.

(56) References Cited

U.S. PATENT DOCUMENTS

| | | | | |
|---|---|---|---|---|
| 3,063,521 | A * | 11/1962 | Fuller | 52/646 |
| 3,139,957 | A * | 7/1964 | Fuller | 52/83 |
| 3,169,611 | A * | 2/1965 | Snelson | 52/648.1 |
| 3,866,366 | A * | 2/1975 | Fuller | 52/81.2 |
| 4,207,715 | A * | 6/1980 | Kitrick | 52/81.4 |
| 4,711,062 | A * | 12/1987 | Gwilliam et al. | 52/646 |
| 5,659,561 | A * | 8/1997 | Torruellas et al. | 372/22 |
| 6,384,945 | B1* | 5/2002 | Hakimi et al. | 398/140 |
| 6,441,801 | B1* | 8/2002 | Knight et al. | 343/915 |

(Continued)

OTHER PUBLICATIONS

Canadas, P., Laurent, V. M., Oddou, C., Isnbey, D., and Wendling, S. (2002). A cellular tensegrity model to analyse the structural viscoelasticity of the cytoskeleton. *J. Theor. Biol.*, 218:115-173.

(Continued)

*Primary Examiner* — David Warren
*Assistant Examiner* — Christina Russell
(74) *Attorney, Agent, or Firm* — Steinfl & Bruno, LLP (57) ABSTRACT

A tensegrity apparatus having multiple tensegrity units for the transmission of solitary waves with adjustable profiles into a material or structure, and the detection of such waves from a material or structure.

22 Claims, 9 Drawing Sheets

(56) References Cited

U.S. PATENT DOCUMENTS

| | | | |
|---|---|---|---|
| 6,868,640 B2* | 3/2005 | Barber | 52/81.1 |
| 6,901,714 B2* | 6/2005 | Liapi | 52/645 |
| 7,411,863 B2* | 8/2008 | Toennessen | 367/20 |
| 7,452,578 B2* | 11/2008 | Lanahan | 428/36.1 |
| 7,578,307 B2* | 8/2009 | Ung et al. | 135/128 |
| 8,106,277 B2* | 1/2012 | Barnett et al. | 84/404 |
| 2002/0190918 A1* | 12/2002 | Stern | 343/912 |
| 2003/0009974 A1* | 1/2003 | Liapi | 52/633 |
| 2006/0027071 A1* | 2/2006 | Barnett et al. | 84/402 |
| 2007/0151202 A1* | 7/2007 | Cox et al. | 52/750 |
| 2008/0040984 A1* | 2/2008 | Lanahan | 52/79.9 |

OTHER PUBLICATIONS

Daraio, C., Nesterenko, V. F., Herbold, E., and Jin, S. (2006). Energy trapping and shock disintegration in a composite granular medium. *Phys. Rev. Lett.*, 96:058002-1-4.

Ekeberg, O. and Pearson, K. (2005). Computer simulation of stepping in the hind legs of the cat: An examination of mechanisms regulating the stance-to-swing transition. *J. Neurophysiol.*, 94(6):4256-4268.

Fraternali, F., Blesgen, T., Amendola, A., and Daraio, C. (2010a). Multiscale mass-spring models of carbon nanotube foams. *J. Mech. Phys. Solid.*, 59(1):89-102.

Fraternali, F., Porter, M., and Daraio, C. (2010b). Optimal design of com-posite granular protectors. Mech. *Adv. Mat. Struct.*, 17:1-19.

Friesecke, G. and Matthies, K. (2002). Atomic-scale localization of high-energy solitary waves on lattices. *Physica D*, 171:211-220.

Friesecke, G. and Pego, R. (1999). Solitary waves on fpu lattices: I. qualitative properties, renormalization and continuum limit. *Nonlinearity*, 12:1601-1627.

Harischandra, N. and Ekeberg, O. (2008). System identification of muscle-joint interactions of the cat hind limb during locomotion. *Biol. Cybern.*, 99(2):125-138.

Ingber, D. (1998). The architecture of life. *Sci. Am.*, pp. 48-57.

Lalvani, H. (1996). Origins of tensegrity: Views of Emmerich, Fuller and Snelson. *Int. J. Space Struct.*, 11:27-55.

Mask, M., Skelton, R. E., and Gill., P. E. (2006). Optimization of tensegrity structures. *Int. J. Solids Struct.*, 43(16):4687-4703.

Mofrad, M. R. K. and Kamm, R. D. (2006). Introduction, with the biological basis for cell mechanics. In Mofrad, M. R. K. and Kamm, R. D., editors, *Cytoskeletal Mechanics: Models and Measurements*, pp. 1-17. Cambridge University Press.

Oppenheim, I. and Williams, W. (2000). Geometric effects in an elastic tensegrity structure. J. Elast., 59:51-65.

Skelton, R. E. (2002). Structural systems: a marriage of structural engineering and system science. *J. Struct. Control*, 9:113-133.

Skelton, R. E. and Sultan, C. (2003). Deployment of tensegrity structures. *Int. J. Solids Struct.*, 40:4637-4657.

Spadoni, A. and Daraio, C. (2010). Generation and control of sound bullets with a nonlinear acoustic lens. *P. Natl. A. Sci.*, 107:7230-1-5.

Sterk, T. (Jul. 2006). Shape control in responsive architectural structures -current reasons and challenges. *Proceedings of the 4th World Conference on Structural Control and Monitoring*, San Diego, CA, USA.

Termonia, Y. (1994). Molecular modeling of spider silk elasticity. *Macro-molecules*, 27:7378-7381.

Tilbert, A. G. and Pellegrino, S. (2003). Review of form-finding methods for tensegrity structures. *Int. J. Space Struct.*, 18(4):209-223.

Vera, C., Skelton, R. E., Bosscns, F., and Sung, L. A. (2005). 3-d nanomechanics of an erythrocyte junctional complex in equibiaxial and anisotropic deformations. *Ann. Biomed. Eng.*, 33(10):1387-1404.

Wang, N., Naruse, K., Stamenoviá, D., Fredberg, J. J., Mijailovich, S. M., ToliáNrrelykke, I. M., Polte, T., Mannix, R., and Ingber, D. E. (2001). Mechanical behavior in living cells consistent with the tensegrity model *Proceedings of the National Academy of Sciences*, 98(14):7765-7770.

You, Z. and Pellegrino, S. (1996). Cable-stiffened pantographic deployable structures. Part 1: Triangular mast. *AIAA Journal*, 34:813-820.

Zhang, L., Maurin, B., and Motro., R. (2006). Form-finding of non-regular tensegrity systems. *J. Struct. Eng.*, 132(9):1435-1440.

International Search Report for PCT Application PCT/US2013/027043 filed on Feb. 21, 2013. Mail date: Jun. 27, 2013.

Written Opinion for PCT Application PCT/US2013/027043 filed on Feb. 21, 2013. Mail date: Jun. 27, 2013.

* cited by examiner

METHOD AND APPARATUS FOR WAVE GENERATION AND DETECTION USING TENSEGRITY STRUCTURES

CROSS-REFERENCE TO RELATED APPLICATIONS

The present application is related to and claims the benefit of the following and commonly assigned U.S. patent application: U.S. Patent Application No. 61/603,824, titled "Tensegrity Materials, Actuators and Sensors," filed on Feb. 27, 2012; whereby the entire contents of this application is incorporated herein by reference.

STATEMENT REGARDING FEDERALLY SPONSORED RESEARCH OR DEVELOPMENT

This invention was made with government support under 0844540 awarded by the National Science Foundation and under N00014-10-1-0718 awarded by the Office of Naval Research. The government has certain rights in the invention

BACKGROUND

1. Field

This disclosure relates to an apparatus based on tensegrity structures (hereafter referred to as tensegrity apparatus) for the transmission of special solitary waves with adjustable profile into a material or structure, and the detection of such waves from a material or structure.

2. Description of Related Art

Tensegrity structures have been considered by researchers working in many different areas, including engineering, mathematics, architecture, biology, and other area. Tensegrity structures generally consist of spatial assemblies of rigid compressive members (bars) and deformable (prestressed) tensile elements (strings or cables), which typically feature geometrically nonlinear mechanical behavior. Tensegrity networks have been employed as model systems in a large variety of form-finding and dynamical control problems of engineering and architecture. It has been shown that such structures can form minimal mass systems for given loads, through assemblies of repetitive units forming "tensegrity fractals." The mechanical response of tensegrity structures relies on the basic laws of attraction and repulsion between mass particles and can be suitably adjusted by changing basic variables, such as mass positions, topology of connections, size, material and prestress of tensile members. It has been recognized in recent years that tensegrity structures may also describe the mechanics of a number of biological structures, such as cell cytoskeletons, the red blood cell membrane, spider fibers, and muscle-bone systems. The tensegrity concept has been employed in space antennas and structures; lightweight and deployable structures; and "smart" (controllable) systems. A tensegrity structure can be designed optimally strong and stiff, through suitable adjustment of the prestress in the tensile members. Each member of the structure can serve as sensor or actuator, if proper control systems are implemented.

The term "tensegrity" is derived from the terms "tensile" and "integrity." The tensegrity structure itself is described, for example, in the 1962 U.S. Pat. No. 3,063,521 to Fuller. The terms "tensegrity elements" and "tensegrity units" are used interchangeably herein and refer to structures having both compression members and tension members, where the tension members are connected to the compression members. The compression members may be bars, struts, columns, etc. that are held in compression within the tensegrity unit. The tension members are cables, wires, strings, etc. which are held in tension within the tensegrity unit. In the tensegrity unit, the ends of the compression members are typically connected to the ends of other compression members with the tension members only.

SUMMARY

Described herein are devices, apparatus, methods, arrays, and systems according to embodiments of the present invention that provide for the generation of adjustable width solitary waves that allow for the production of strain and stress waves with profiles that vary with wave speed.

This disclosure describes a novel application of tensegrity structures, exploring their use as networks supporting energy transport through solitary waves. As discussed below, the elastic potential of a "regular minimal tensegrity prism" (such as that described by Skelton, R. E. and de Oliveira, M. C., *Tensegrity Systems*, Springer (2010)) belongs to the class of non-linear potentials analyzed in Friesecke, G. and Matthies, K. (2002), Atomic-scale localization of high-energy solitary waves on lattices, *Physica D*, 171:211-220, which characterize lattices supporting solitary waves with profile dependent on the wave speed. The symmetrical axial loading of such a system is particularly addressed, in order to examine its highly nonlinear dynamic response within a simple and effective one-dimensional framework. Examination of the waveform of compression waves traveling through chains of tensegrity prisms shows that the profile of these waves localizes on a single lattice spacing (i.e., on a single prism) in the limit for the wave speed tending to infinity.

The use of tensegrity structures as networks for supporting energy transport through solitary waves is described herein. The structures described herein support the use of "tensegrity lattices" (or "crystals") as novel materials to control stress propagation and produce energy trapping; innovative tendon- and strut-controlled structures for seismic applications; as well as novel acoustic devices, such as acoustic lenses capable of focusing pressure waves in very compact regions in space.

An embodiment of the present invention is an apparatus for propagation of solitary waves, the apparatus comprising: a plurality of tensegrity units, a plurality of junction elements, wherein one or more junction elements from the plurality of junction elements are disposed between adjacent tensegrity units in the plurality of tensegrity units, wherein each tensegrity unit comprises a plurality of compression members having and a plurality of tension members connected thereto, and wherein one or more tensegrity units, one or more junction elements, or one or more junction elements and one or more tensegrity units are configured to support propagation of a solitary wave with specified wave characteristics.

Another embodiment of the present invention is a method for generating solitary waves with specified characteristics, the method comprising: disposing a plurality of tensegrity units, wherein one or more tensegrity units have adjustable parameters; disposing one or more junction elements between one or more adjacent tensegrity units; receiving one or more incident pulses at an end element coupled to one tensegrity unit; and, adjusting the adjustable parameters to generate a solitary wave with the specified characteristics.

Another embodiment is a system for solitary wave generation or detection, the system comprising a solitary wave pulse generator, the solitary wave pulse generator comprising: a plurality of tensegrity units, wherein the tensegrity units have tensegrity unit parameters; a plurality of junction elements, wherein the junction elements have junction element masses and wherein one or more junction elements are disposed between adjacent tensegrity units of the plurality of tensegrity units; and, an end member coupled to at least one tensegrity unit, the end member configured to receive one or more incident pulses, wherein the tensegrity unit parameters and the junction element masses are selected to generate a solitary wave pulse with specified characteristics.

DETAILED DESCRIPTION

The exemplary embodiments according to the present invention described in this disclosure provide devices, apparatus, methods, arrays and systems that provide for the generation of adjustable width solitary waves that allow for the production of strain and stress waves with profiles that vary with wave speed.

Figure 1:
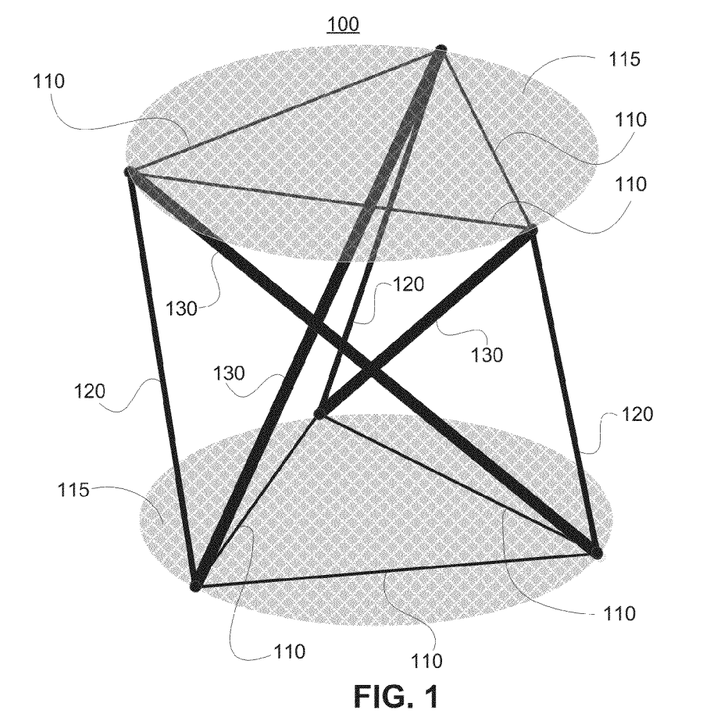
FIG. 1 is a diagram of a regular minimal tensegrity prism.

FIG. 1 shows a regular minimal tensegrity prism 100 consisting of two parallel equilateral triangles, each triangle defined by three terminal strings 110; three deformable cross-strings (or cables) 120; and, three rigid bars 130. End faces defined by the two parallel equilateral triangles are assumed to be are rigid, due to the inextensibility of the terminal strings and/or the presence of terminal masses (e.g., stiff discs) 115 at the extremities. In addition, it is assumed that the prism is loaded by symmetric axial forces about the longitudinal. Under such assumptions, it can be shown that the prism has a single degree of freedom, which may consist of either the relative twist angle $\phi$ about the longitudinal axis, or the relative axial displacement r between the end faces.

Oppenheim and Williams (Oppenheim, I. and Williams, W., Geometric effects in an elastic tensegrity structure., *J. Elast.*, 59:51-65), presented a derivation of the constitutive equations of a regular minimal tensegrity prism. This derivation is discussed below. In the derivation below, L is the bar length of the rigid bars; a is the distance between the centroids and vertices of the end face equilateral triangles; k is the stiffness of the cross-strings; p is the prestrain of the cross-strings; and, m is the total mass of the tensegrity prism. One specific instantiation of the prism shown in FIG. 1 is a prism where the cross-strings 120 and terminal strings 110 are nylon wires of 6 mm diameter; the bars 130 are pultruded carbon tubes, each having an outer diameter of 4 mm and an inner diameter of 2.54 mm, and each having a length L=0.18 m, the distance a between the centroid and the vertices of the end triangles is equal to 0.07 m; and the terminal masses 115 are polycarbonate discs that are 14 cm in diameter and 1.58 mm thick. The total mass m of a single prism (three bars 130, three cross-strings 120, six terminal strings 110, and one polycarbonate disc 115) is 35.34, where the mass of the disc 115 is 29.02 g and the total mass of the other components is 6.32 g.

If it is assumed that the end faces are rotated relative to each other by an arbitrary twist angle $\phi$ and enforcing a fixed length constraint for the bars, the kinematical relationship between $\phi$ and the prism height h is shown by Eq. 1 and Eq. 2 below:

$$h = \sqrt{L^2 - 2a^2(1 - \cos\varphi)} \qquad \text{Eq. 1}$$

$$\varphi = \arccos\left(1 - \frac{L^2 - h^2}{2a^2}\right) \qquad \text{Eq. 2}$$

The lower bound of $\phi$ is $-\pi/3$, where the cross-strings touch each other, and the upper bound of $\phi$ is $\pi$, where the rigid bars touch each other. Accordingly, the prism height ranges between the bounds shown in Eq. 3 below $$h_{lb} = \sqrt{L^2 - 4a^2}, h_{ub} = L \qquad \text{Eq. 3}$$

with $h_{lb}$ corresponding to $\phi=\pi$, and $h_{ub}$ corresponding to $\phi=0$.

The cross-string length $\lambda$ is related to $\phi$ and h as shown in Eq. 4 below:

$$\lambda = \sqrt{L^2 - 3a^2\cos\varphi - \sqrt{3}\, a^2\sin\varphi}$$
$$= \frac{\sqrt{2}}{2}\sqrt{a^2\left(6 - \sqrt{3}\sqrt{-\frac{(h^2-L^2)(4a^2+h^2-L^2)}{a^4}}\right) + 3h^2 - L^2} \qquad \text{Eq. 4}$$

The elastic energy U of the prism is calculated by summing the potential energies of the cross-strings. The potential energy of each cross-string is $k/2(\lambda-\lambda_N)^2$ and $\lambda_N$ is the natural length (length at zero stress) of each cross-string, the elastic energy U is shown by Eq. 5 below:

$$U = \frac{3}{2}k(\lambda - \lambda_N)^2 \qquad \text{Eq. 5}$$

The substitution of Eq. 4 into Eq. 5 shows that the relationship of U to h (or $\phi$) is clearly strongly nonlinear. The axial force F vs. h relationship is then shown as Eq. 6 below:

$$F = \frac{dU}{dh} = 3k(\lambda - \lambda_N)\frac{d\lambda}{dh} \qquad \text{Eq. 6}$$

where $$\frac{d\lambda}{dh} = \frac{h}{2\lambda}\left(3 + \frac{\sqrt{3}(2a^2 + h^2 - L^2)}{a^2\sqrt{-\frac{(h^2-L^2)(4a^2+h^2-L^2)}{a^4}}}\right) \qquad \text{Eq. 7}$$

The equilibrium configurations of the prism correspond to F=0. The unique minimum of U is achieved for $\phi=\phi_0=5/6\,\pi(150°)$, within the feasible range of $\phi$, assuming that the strings are in tension. This stable equilibrium configuration will be hereafter referred to as tensegrity placement. The twist angle $5/6\pi$ corresponds with the following equilibrium values of the height and cross-string length as shown in Eq. 8 below:

$$h_0 = \sqrt{L^2 - (2+\sqrt{3})a^2}, \lambda_0 = \sqrt{L^2 - 2\sqrt{3}\,a^2} \qquad \text{Eq. 8}$$

The prestrain p of the cross-strings at the tensegrity placement is shown in Eq. 9 below. The prestrain is assumed to be positive.

$$p = \frac{\lambda_0 - \lambda_N}{\lambda_N} \qquad \text{Eq. 9}$$

Using the tensegrity placement as the reference, the relative axial displacement r between the end faces may be defined as shown in Eq. 10 below:

$$r = h - h_0 \qquad \text{Eq. 10}$$

with $r \in (r_{lb}, r_{ub})$ where $r_{lb} = h_{lb} - h_0 < 0$, and $r_{lb} = h_{ub} - h_0 > 0$.

An axial strain $\epsilon$ may be calculated as shown in Eq. 11 below. The axial strain $\epsilon$ is positive when the prism is shortened with respect to the tensegrity placement ($r<0$).

$$\varepsilon = \frac{h_0 - h}{h_0} \qquad \text{Eq. 11}$$

The upper bound of $\epsilon$ is known as the limit strain of the prism. Eq. 12 below shows that how this parameter is calculated.

$$\varepsilon_{lim} = \frac{h_0 - h_{lb}}{h_0} \qquad \text{Eq. 12}$$

The relationship of U and F with r and $\epsilon$ are obtained by inserting Eqs. 11 and 12 into Eqs. 5 and 6, respectively. Eq. 13 below shows the relationship of U vs. r:

$$U(r) = \frac{3}{2}k\left[\frac{\sqrt{3(h_0+r)^2 - L^2 + a^2(6-\sqrt{3}\,c(r))}}{\sqrt{2}} - \frac{\lambda_0}{1+p}\right]^2 \qquad \text{Eq. 13}$$

where $$c(r) = \sqrt{\frac{[L^2 - (h_0+r)^2][4a^2 + (h_0+r)^2 - L^2]}{a^4}} \qquad \text{Eq. 14}$$

The U vs. h, r, $\epsilon$ and F vs. h, r, $\epsilon$ relationships show vertical asymptotes for $h=h_{lb}$, $r=r_{lb}$ and $\epsilon=\epsilon_{lb}$ respectively. Such a "locking" behavior in compression is characteristic of lattices supporting solitary waves featuring atomic-scale localization in the high-energy limit. The locking behavior is typical, e.g., of Lennard-Jones potentials, which exhibit a minimum point at a given equilibrium distance $d>0$ and blow-up as the distance between neighbor masses tends to zero. The locking displacement d of the tensegrity prism (measured from the tensegrity placement) is equal to $-r_{lb}$.

Figure 2A:
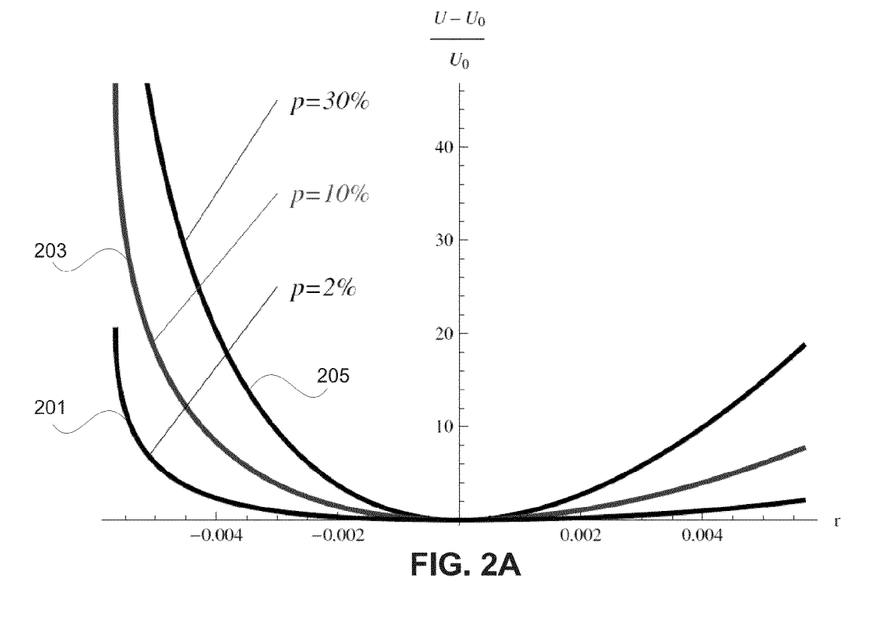
FIG. 2A is a graph of normalized tensegrity potential for various cross-string prestrains.
Figure 2B:
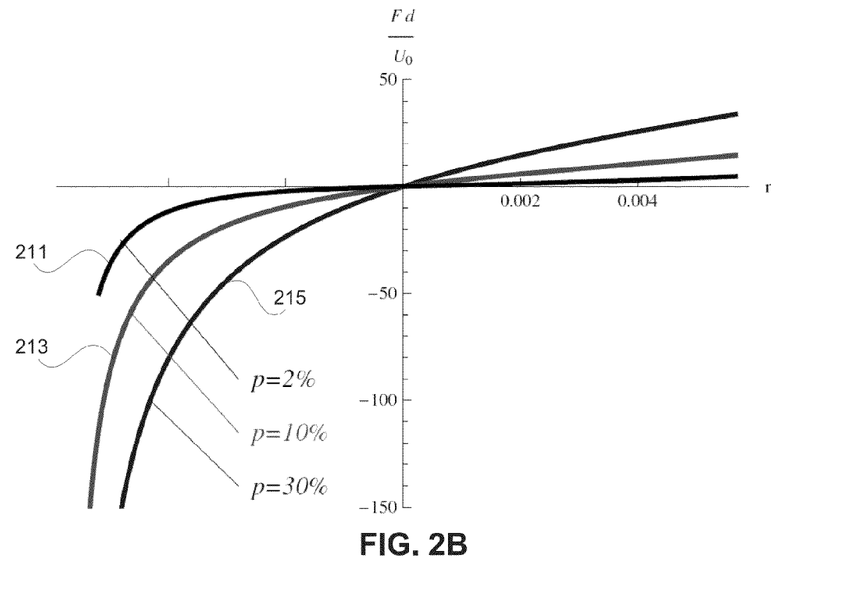
FIG. 2B is a graph of the normalized axial force for various cross-string prestrains.

FIGS. 2A and 2B show the calculated tensegrity potential and axial force for the specific instantiation of the tensegrity prism shown in FIG. 1 discussed above, where that instantiation has bar lengths L=0.18 and a centroid to vertex distance a=0.07 m. Note that the tensegrity prism characteristics illustrated in FIGS. 2A and 2B uses a cross-string stiffness k=4.6417×10⁴ N/m. FIGS. 2A and 2B illustrate the locking behavior of the tensegrity prism with d=5.66×10⁻³ m and $\epsilon_{lim}$=4.77%. FIG. 2A shows the tensegrity potential from the relationship shown in Eq. 15 for various cross-string prestrains p:

$$V(r) = U(r) - U_0 \qquad \text{Eq. 15}$$

$U_0$ denotes the potential energy of the tensegrity placement, which is not zero due to the prestress of the tensile members. FIG. 2A shows the normalized tensegrity potential V for p=2% (line 201), p=10% (line 203) and p=30% (line 205). FIG. 2B shows the normalized axial force F for p=2% (line 211), p=10% (line 213) and p=30% (line 215).

One-dimensional lattices endowed with suitable nonlinear interaction potentials (like, e.g., Lennard-Jones potentials of the form $V_{LJ}$, $(r)=c((r+d)^{-m}-d^{-m})^2$) are traversed by solitary waves with profile dependent on the ratio between the wave speed c and the sound speed $c_s$. In particular, such potentials support atomic-scale localization of solitary waves in the high-energy limit, and feature the following regularity conditions:

(H1) minimum at zero: $V \in C^3(-d,\infty)$, $V \geq 0$, $V(0)=0$, $V''(0) > 0$;

(H2) growth: $V(r) \geq c_0(r+d)^{-1}$, for some $c_0>0$ and all r close to $-d$;

(H3) hardening: $V'''(r) < 0$ in $(-d, 0)$, $V(r) < V(-r)$ in $(0, d)$.

For $c \approx c_s$, the continuum limits of the strain waves traveling on lattices endowed with such potentials have a small-amplitude profile of the form $\epsilon_c(4 = \epsilon_{sech^2}(x) + O(\gamma^4)$, where x is a coordinate centered at the wave peak and the other parameters in this profile are defined as shown in Eqs. 16 to 18 below:

$$\varepsilon_{sech^2}(x) = -\frac{a}{bh_0}\left(\frac{\lambda}{2}\text{sech}\left(\frac{\gamma x}{2h_0}\right)\right)^2 \qquad \text{Eq. 16}$$

with $$\gamma^2 = 24\frac{c-c_s}{c_s}, a = V''(0), b = V'''(0) \qquad \text{Eq. 17}$$

$$c_s = h_0\sqrt{\frac{V''(0)}{m}} \qquad \text{Eq. 18}$$

where $h_0$ denotes the lattice spacing.

Differently, for $c \gg c_s$ (that is, $c \to \infty$), the strain waves tend to assume a piecewise linear profile $\epsilon_\infty(x)$, which is concentrated on a single spacing and defined as shown in Eq. 19 below:

$$\varepsilon_\infty(x) = \begin{cases} 0 & \text{if } x/h_0 \leq -1, \\ d/h_0(1-|x/h_0|) & \text{if } x/h_0 \in [-1,1], \\ 0 & \text{if } x/h_0 \geq 1. \end{cases} \qquad \text{Eq. 19}$$

The tensegrity potential shown in Eq. 15 above matches the conditions H1 and H2 discussed above. In particular, the condition of minimum at zero (H1) is a consequence of the choice of the tensegrity placement as reference, while the growth condition (H2) follows from the vertical asymptote of the tensegrity potential V(r) at $r=r_{lb}=-d$, as shown in FIG. 2A. Concerning the hardening condition (H3), such a property is verified if it results in $V'''(r)<0$ in $(-d, d]$. Numerical computations show that the latter condition is matched by the tensegrity potentials discussed above.

Figure 3:
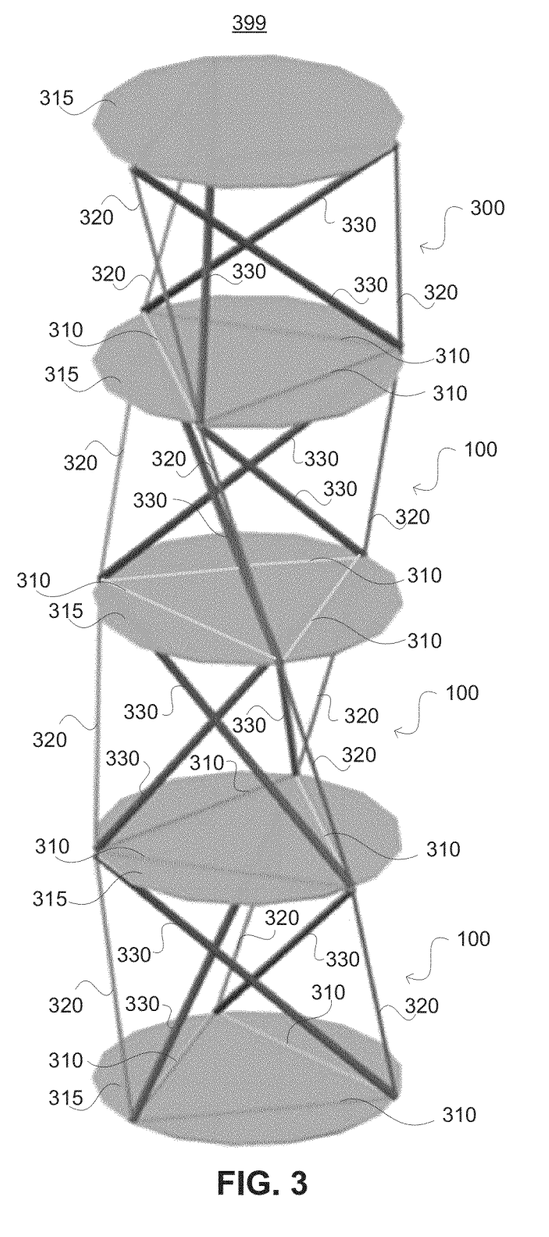
FIG. 3 shows a chain of tensegrity prisms.

Multiple tensegrity prisms can be arranged in a chain of tensegrity prisms such as shown in FIG. 3. FIG. 3 shows four tensegrity prisms 300 arranged in a chain, but other chains may have tens or hundreds of prisms or more. Numerical analysis is performed for a chain of 300 tensegrity prisms, where each prism in the chain has the properties described in the instantiation of the single tensegrity prism described above and shown in FIG. 1 (such that $c_s$=147.5 m/s). The analysis is performed by analyzing the strain waves $\epsilon_{tens}$ that are produced by the impact of an external striker of mass $m_s$=28 g with the chain. The speed, amplitude and profile of $\epsilon_{tens}$ is numerically determined at steady state by employing a fourth-order Runge-Kutta integration scheme to solve the Newton equations of motion of the different masses forming the system. The chain is described as a mass-spring system, by lumping the prisms' masses (largely due to the terminal polycarbonate discs 115 shown in FIG. 1) at the end faces, and modeling the prisms as nonlinear elastic springs governed by potential as described in Eq. 15. A prestrain p=2% is used for the cross-strings, and the analysis uses a time-integration step equal to $10^{-8}$ s. Waves with different speeds are generated by prescribing different impact velocities to the striker.

Figure 4:
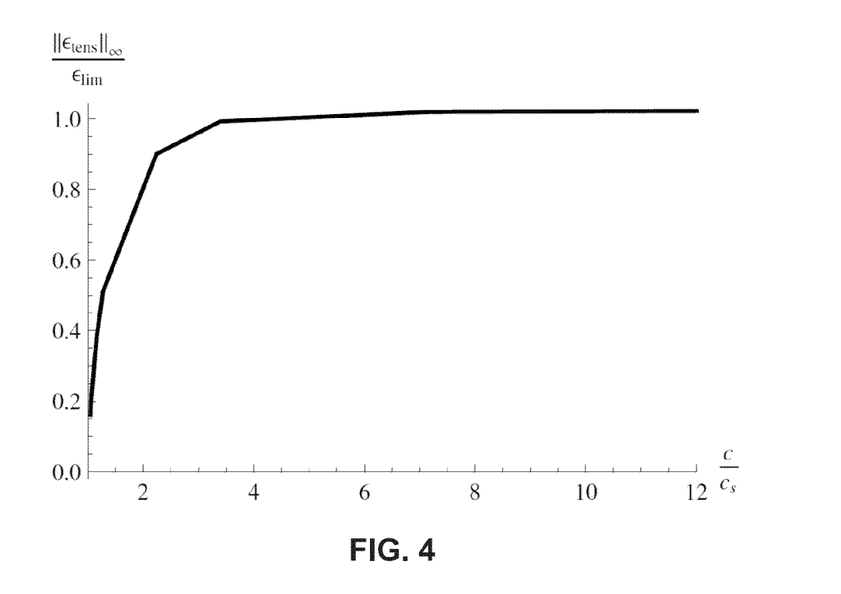
FIG. 4 is a graph of the numerical correlation between the $L^\infty$ norm of the strain wave and the wave speed.
Figure 5A:
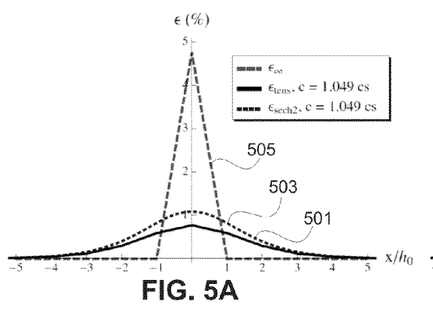
FIGS. 5A-5F show the profiles that correspond to different wave speeds within a tensegrity lattice.
Figure 5B:
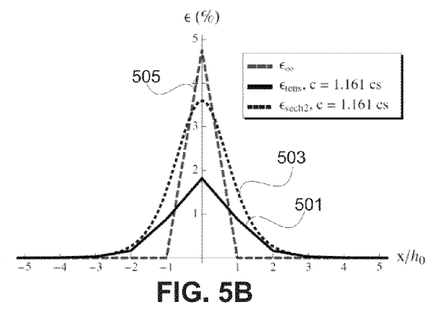
Figure 5C:
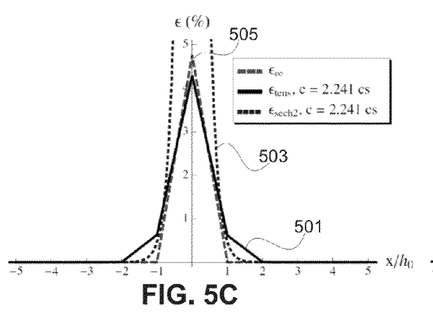
Figure 5D:
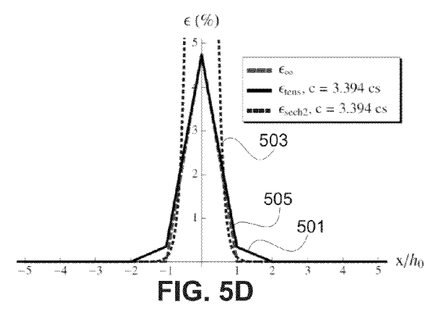
Figure 5E:
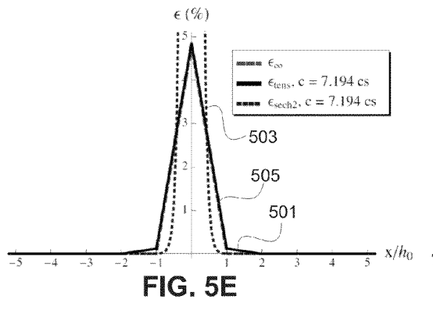
Figure 5F:
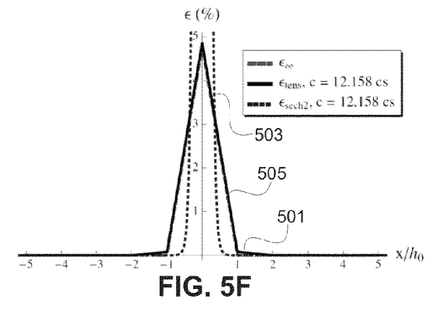

FIG. 4 shows the numerical correlation obtained between the $L^\infty$ norm ($\|\epsilon_{tens}\|_\infty$) of $\epsilon_{tens}$ (i.e., the essential supremum of $|\epsilon_{tens}|$) and the wave speed c. Specifically, FIG. 4 shows the ratio between the $L^\infty$ norm of the strain wave amplitude in the 300 prism tensegrity chain and the limit strain $\epsilon_{lim}$ as a function of the ratio between the wave speed c and the sound speed $c_s$. FIG. 4 shows that $\|\epsilon_{tens}\|_\infty$ asymptotically converges to the limit strain $\epsilon_{lim}$ for c→∞, with $\|\epsilon_{tens}\|_\infty > 0.99\epsilon_{lim}$, for c≥3.4 $c_s$.

The profiles $\epsilon_{tens}$ (x) corresponding to different wave speeds c are illustrated in FIGS. 5A-5F. In FIGS. 5A-5F, lines 501 show the strain wave profiles $\epsilon_{tens}$, lines 503 show the theoretical sonic profiles $\epsilon_{sech^2}$, and lines 505 show the theoretical supersonic profiles $\epsilon_\infty$. FIGS. 5A-5F highlight that the $\epsilon_{sech^2}$ profile shown in Eq. 16 always features an amplitude larger than $\epsilon_{tens}$, over the entire window c ∈[1.05, 12.16]$c_s$. In particular, a good matching is observed between $\epsilon_{sech_2}$ and $\epsilon_{tens}$ for c=1.05 $c_s$, and, on the contrary, marked deviations between such profiles for c≥1.16 $c_s$. The results shown in FIGS. 5A-5F also reveal that $\epsilon_{tens}$ (x) is localized on about 7 prisms for c=1.05 $c_s$; 5 prisms for c=1.16 $c_s$; and 3 prisms for c=2.24 $c_s$ and c=3.39 $c_s$. For values of c=7.19 $c_s$ and c=12.16 $c_s$ the values of $\epsilon_{tens}$ (x) at x=±$h_0$ are observed to be rather negligible compared to $\epsilon_{tens}$ (0), which implies the localization of $\epsilon_{tens}$ on a single prism. In particular, $\epsilon_{tens}$ (x) essentially coincides with the supersonic profile shown in Eq. 19 for c=12.16 $c_s$.

Figure 9:
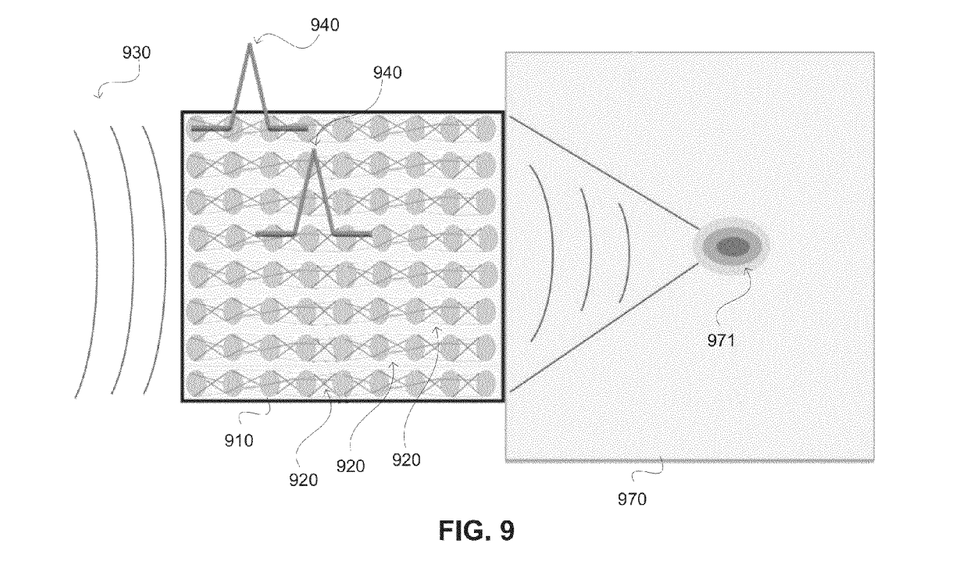
FIG. 9 shows a tensegrity apparatus configured as an acoustic lens.
Figure 10:
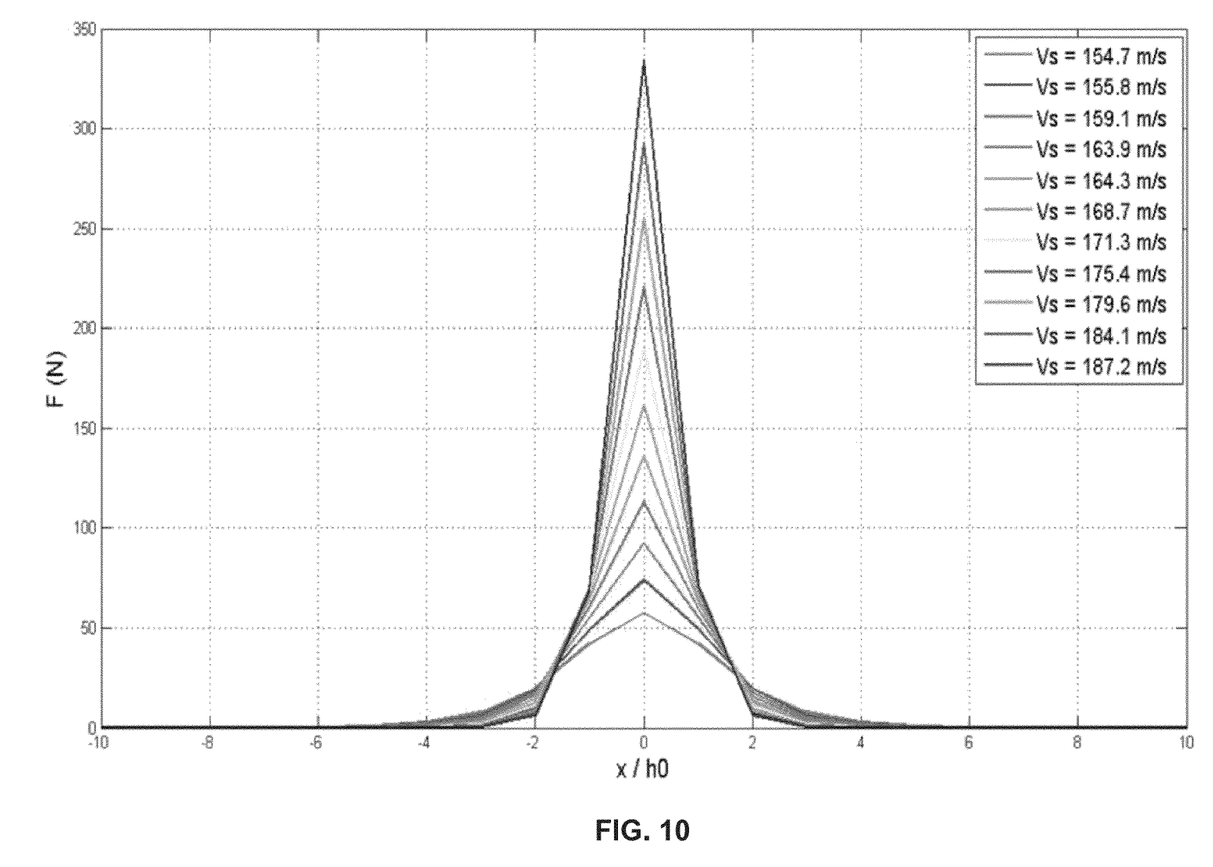
FIG. 10 shows the variable profiles of stress waves traveling in a tensegrity lattice for different wave speeds.

FIG. 9 shows the variable profiles of stress waves traveling in the tensegrity lattice described above for different wave speeds. The axial force F is highest at the highest wave speed of 187.2 m/s and the force F is lowest at the lowest wave speed of 154.7 m/s. AS shown in FIG. 9, the wave width progressively shrinks for increasing Vs and, correspondingly, the amplitude of the stress wave grows with the increasing Vs.

From the discussion above, it has been shown that shown that solitary waves traveling through a model tensegrity lattice approximately span blocks of 5 to 7 prisms, when the wave speed c is almost equal to the speed of sound $c_s$. In the same ('sonic') regime, the wave profile approximately exhibits a $sech^2$ shape. The wave width progressively shrinks for increasing values of c, leading to a piecewise linear wave profile featuring "atomic-scale localization" of the wave (that is, localization on a single prism) for c→∞. The above features of tensegrity lattices can be suitably tuned by adjusting mass, stiffness, prestress and geometrical properties, with the aim of performing desired wave localization for prescribed wave speed ranges. As described in additional detail below, such systems may be usefully exploited to design innovative "tensegrity crystals" suitable for application in stress mitigation and redirection; controllable structures for seismic applications; as well as in acoustic systems and devices.

A tensegrity apparatus consisting of tensegrity elements (hereinafter referred to as tensegrity units) and lumped masses placed in between the tensegrity elements (hereinafter referred to as junction elements) provides for the generation of adjustable width solitary waves (AWSWs). This tensegrity apparatus is able to produce strain and stress waves with profiles variable with the wave speed. The support of such waves converges to zero; the amplitude of the strain waves converges to a finite limiting value; and the amplitude of the stress waves converges to infinity, as the wave speed progressively grows beyond the speed of sound (as shown in FIGS. 5A-5F). The apparatus may feature arbitrary geometry, materials and state of prestress in the tensegrity units.

The tensegrity apparatus features two different limit regimes: (i) in the low-energy (sonic) regime the apparatus supports the formation and propagation of solitary waves which exhibit a squared hyperbolic secant shape, and (ii) in the high-energy (ultrasonic) regime the apparatus supports atomic-scale localization of the traveling pulses, that is, localization of such pulses on a single tensegrity unit (forces and strains different from zero in a single unit). In particular, in the ultrasonic regime, the stiffness of the units traversed by the solitary pulses grows with the wave speed, with the result that the axial deformation of such elements converges to a limit (saturation) value for increasing speeds, while the corresponding force grows towards infinity ("locking" feature). The relationships between wave speed, wave width and wave amplitude can be suitably adjusted by playing with geometrical and mechanical properties of tensegrity units and junction elements, and adjusting the prestress of the tensile elements of the tensegrity units.

The atomic-scale localization of the generated solitary pulses and the associated locking behavior of the tensegrity apparatus represent two distinctive features, as compared to existing actuators and sensors supporting highly nonlinear waves (HNWs) with fixed width.

In one exemplary embodiment, the tensegrity apparatus may consist of tensegrity units such as the tensegrity prism, arranged into a one-dimensional chain 399 of tensegrity units. As briefly discussed above, FIG. 3 depicts four tensegrity units 300 arranged into a chain 399, where each tensegrity unit 300 is a tensegrity prism that consists of the tensegrity unit members of six terminal strings 310; three deformable cross-strings (or cables) 320; and, three rigid bars 330. Junction elements 315 such as discs are interposed between the tensegrity units 300 to provide the chain with desired mass. The tensegrity unit members 310, 320, 330 may also serve as sensors or actuators by embedding strain gauges or other displacement or stress sensor elements in the strings 310, 320 or bars 330. The junction elements 315 may also serve as sensors by, for example, embedding piezoelectric layers in the elements 315.

Figure 6:
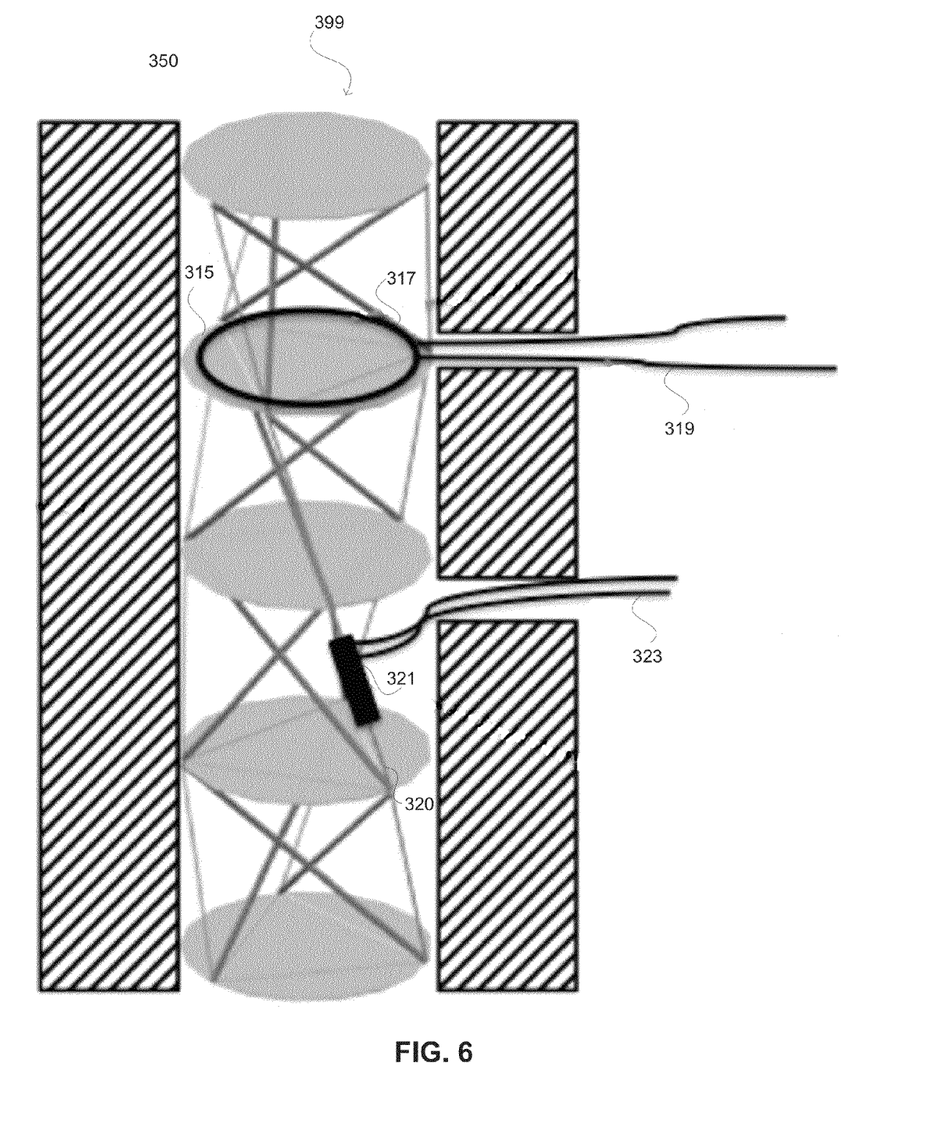
FIG. 6 shows a tensegrity apparatus supported by a sleeve.

FIG. 6 shows the tensegrity apparatus 399 of FIG. 3 supported by a sleeve or matrix 350. The sleeve 350 provides for structural stability for the chain 399 and may also facilitate the handling of the apparatus 399. Piezoelectric layers 317 may be disposed in the junction elements 315. These piezoelectric layers 317 may serve as sensors which are connected to monitoring equipment via wires 319 or the layers 317 may serve as actuating mechanisms controlled via the wires 319. The tensegrity apparatus 399 may have several such layers 317 disposed throughout the apparatus 399. The tensegrity apparatus 399 may also have displacement or stress sensor devices 321, such as strain gauges, coupled to cross-strings 310 or coupled to the terminal strings 310 or bars 330. The tensegrity apparatus 399 may have several such devices 321 disposed throughout the apparatus 399. Wires 323 are used to carry data from the sensor devices 321 to monitoring equipment.

Figure 7A:
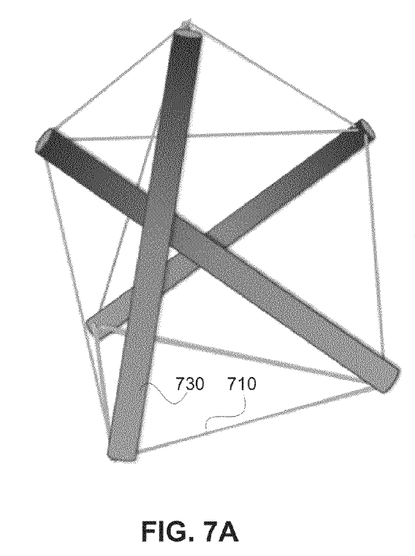
FIG. 7A shows a tensegrity prism.
Figure 7B:
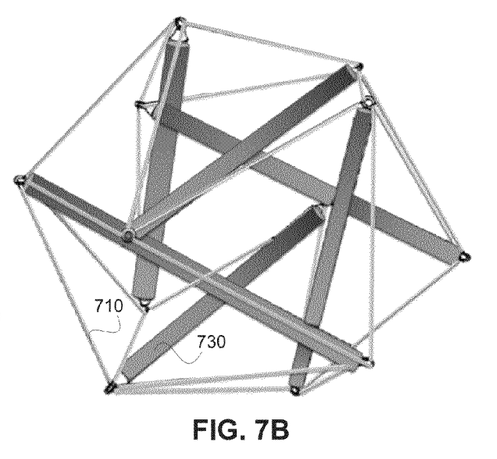
FIG. 7B shows a tensegrity icosahedron.
Figure 7C:
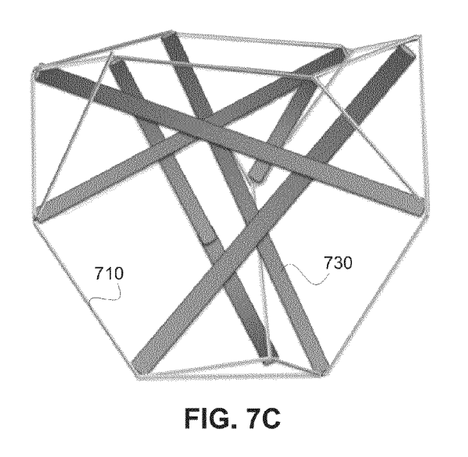
FIG. 7C shows a tensegrity tetrahedron.

The tensegrity apparatus are not limited to the regular minimal tensegrity prisms arranged in a chain as described above. In general, the tensegrity apparatus consists of a spatial assembly of tensegrity units, such as the tensegrity prisms described above, but also tensegrity diamonds, tensegrity zigzag structures, and other tensegrity structure, along with junction elements. FIGS. 7A-7C depict other tensegrity structures that may comprise the tensegrity units used in the described tensegrity apparatus. FIG. 7A shows another depiction of a tensegrity prism with bars 730 and strings 710. FIG. 7B shows a tensegrity icosahedron having bars 730 and strings 710. FIG. 7C shows a tensegrity tetrahedron having bars 730 and strings 710. The geometries associated with the tensegrity apparatus may be arbitrary. The junction elements of the tensegrity apparatus may consist of layers, discs, and/or other elements of arbitrary shape and material, which provide the apparatus with desired mass. The junction elements may be solid.

When used for AWSW generation, the tensegrity apparatus is activated by incident pulses in correspondence with one or more mass elements within the apparatus. As described above, the tensegrity apparatus may contain piezoelectric layers in the junction elements, connected by wires to transfer data, and/or strain gauges or other displacement/stress sensors in the bars and strings of the tensegrity units. These devices allow for the response of the apparatus to be measured and controlled by, for example, adjusting the prestress of the tensile elements of the tensegrity units.

The tensegrity apparatus described herein prove the capability to transform a given incident acoustic signal into either a single solitary pulse or trains of solitary pulses featuring suitably tunable compact support and arbitrarily large amplitude. The latter properties can be adjusted while the apparatus is in use, through suitable control of the prestress and geometric properties of the elements of the tensegrity units. The solitary waves generated by the tensegrity apparatus can travel finite distances in the host medium while retaining their shape.

Figure 8:
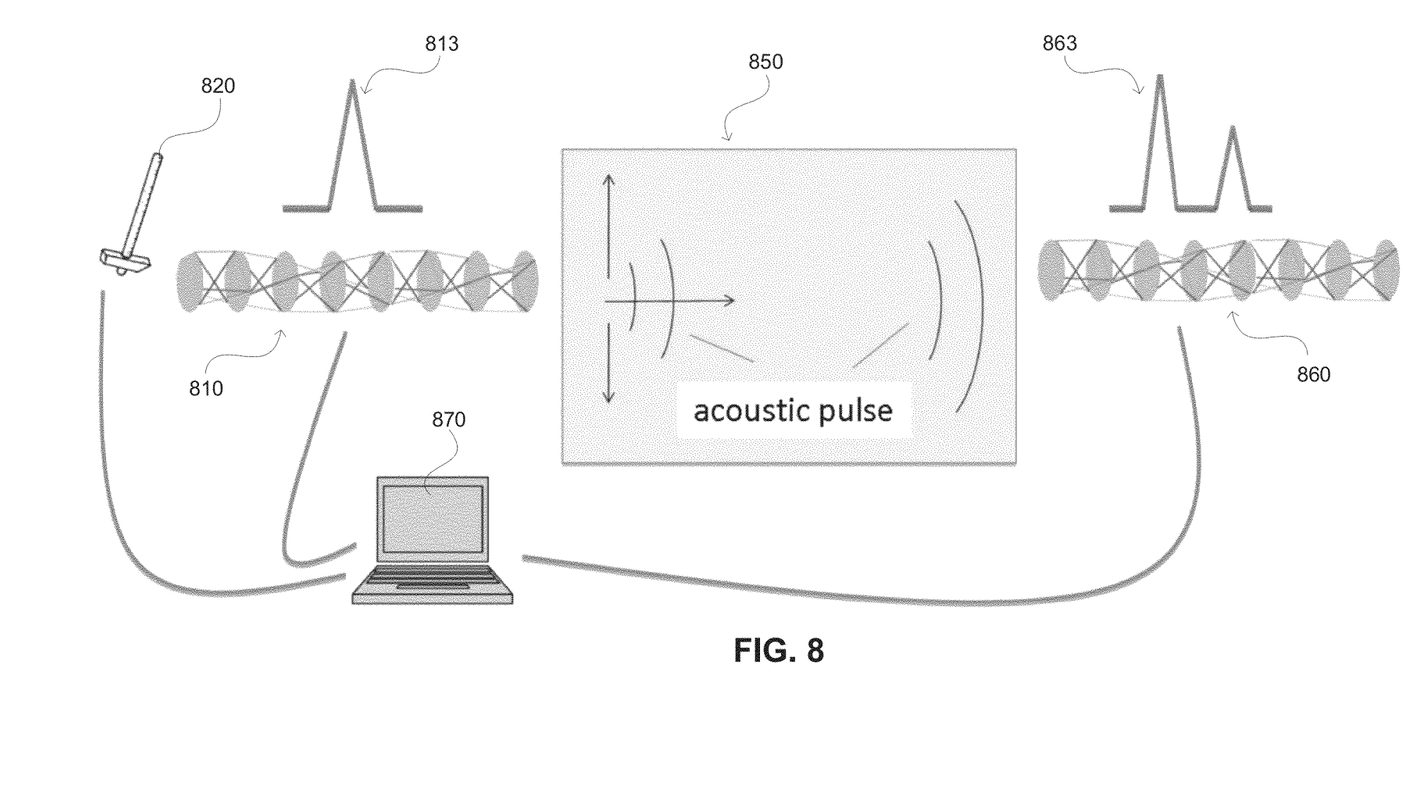
FIG. 8 shows a tensegrity apparatus configured as a non-destructive evaluation and monitoring tool.

Combined tensegrity actuator-sensor systems can be used to detect the mechanical properties and/or the presence of damage in materials and structures through closed-loop identification procedures. The tensegrity apparatus described herein may be used for nondestructive evaluation and monitoring of materials and structures. FIG. 8 is a schematic diagram that illustrates the use of tensegrity apparatus as a nondestructive evaluation and monitoring tool. In FIG. 8, a tensegrity apparatus 810 configured as a pulse generator generates a single or a train of ANSWs 813, which are directed into the element 850 or structure under test. An external actuator 820 is used to provide incident pulse to the pulse generator tensegrity apparatus 810. The propagating wave within the medium of the element 850 under test may comprise linear stress waves and/or highly nonlinear waves. An output pulse is received by a tensegrity apparatus 860 configured as a sensor to produce with a single or a train of ANSWs 863. A computer 870 may be used to collect and store data from the pulse generator tensegrity apparatus 810, the sensor tensegrity apparatus 860 and the actuator 820 to provide an analysis of the element 850 or structure under test.

The compact and transient pulses generated by the tensegrity apparatus described herein can also be used as a noninvasive scalpel to accurately target tumors in hyperthermia applications, and for lithotripsy applications. FIG. 9 is a schematic diagram that shows a tensegrity apparatus configured as an acoustic lens. The acoustic lens 910 consists of an array of tensegrity apparatus 920 subject to different levels of prestress with respect to each other, in such a way that an incident signal 930 generates AWSWs 940 with different phases within the lens 910, which combine at a focal point 971 (i.e., form a "sound bullet") in the adjacent host medium 970. The "sound bullet" may then act as a noninvasive scalpel. The generation of "sound bullets" from the tensegrity apparatus described herein may find other applications for biomedical, defense, or other uses.

In other application, the tensegrity apparatus described herein may be used as an effective filter, which is able to tune the frequency content of the generated pressure wave by controlling the mechanical prestress in the tensile elements of the tensegrity units, the size of the compressed elements of the same units, and the mass of the junction elements.

The fabrication of tensegrity apparatus may follow two interconnected routes, either a manual assembly approach or a more automated structure generation approach. For the initial proof-of principle and for the study of one-dimensional arrays of simple tensegrity prisms and two-dimensional structures, manual assembly may be used, starting from fibers and cables of selected materials and lengths. This approach enables carefully tuning of the cable tension and accurately insertion of the local strain gauges and piezo-sensors for the dynamic measurements. The manually assembled materials may then be immersed, as desired, in a polymeric matrix for support. This can be achieved by using an uncured polymeric solution in a bath, followed by degassing and oven curing.

A more automated approach may be used for more complex geometries, where the fabrication can rely on state-of-the art multimaterial 3D printing, capable of printing three-dimensional composites with a maximum size of 490×390×200 mm for a single print. The 3D printer jets multiple model materials simultaneously, and can combine a wide range of mechanical properties (obtaining polymeric materials with stiffness ranging from 30-3000 MPa). The printer can produce small feature sizes: thin walls down to 600 δm and horizontal layers of 16 μm, using multiple colors to aid visualization of the samples deformation. The design of the materials to be printed may be first produced in a 3D drawing (e.g., AutoCAD® or SolidWorks® drawings) and then provided to a workstation. This advanced fabrication method allows achieving more complex geometries. The choice of feature sizes, materials properties and overall sample size will determine the response of the system. In this case, the cables' pretension may be determined based on the addition of static precompression on the structure, and not by regulating the tension of each individual cable.

Other approaches for fabrication and assembly of the tensegrity apparatus described herein may also be used. For example, micro-machining approaches may be used for some applications. Rapid prototyping techniques similar to the 3D printing technique described above may be used for other applications.

The tensegrity apparatus described herein illustrates the creation and fabrication approaches for a new type of heterogeneous structures and composite materials with tunable mechanical properties. Tensegrity materials are here defined as periodic arrays of tensegrity structures, freestanding or embedded in a matrix. The described tensegrity apparatus exploits the use of tensegrity structures as building blocks for the creation of tunable composites with unique mechanical properties. A tensegrity composite material consists of an assembly of fibers and bars organized in a period structure and embedded in a matrix. The tensegrity structures act as "engineered structural foams" that provide unique responses to the overall material, and their behavior is controlled by controlling their specific design geometry. Hence, the tensegrity apparatus described herein may serve as the building block for innovative composite materials with selectable dynamic properties.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. In particular it is to be understood that the disclosures are not limited to particular compositions or biological systems, which can, of course, vary. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. It is also to be understood that the terminology used herein is for the purpose of describing particular embodiments only, and is not intended to be limiting. Reference to a claim element in the singular is not intended to mean "one and only one" unless explicitly so stated. As used in this specification and the appended claims, the singular forms "a," "an," and "the" include plural referents unless the content clearly dictates otherwise. The term "several" includes two or more referents unless the content clearly dictates otherwise. Unless defined otherwise, all technical and scientific terms used herein have the same meaning as commonly understood by one of ordinary skill in the art to which the disclosure pertains.

Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . ." and no method or process step herein is to be construed under those provisions unless the step, or steps, are expressly recited using the phrase "comprising step(s) for . . . ."

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. An apparatus for propagation of solitary waves, the apparatus comprising:
   a plurality of tensegrity units,
   a plurality of junction elements, wherein one or more junction elements from the plurality of junction elements are disposed between adjacent tensegrity units in the plurality of tensegrity units,
   wherein each tensegrity unit comprises a plurality of compression members and a plurality of tension members connected thereto, and
   wherein one or more tensegrity units, one or more junction elements, or one or more junction elements and one or more tensegrity units are configured to support propagation of a solitary wave with specified wave characteristics.

2. The apparatus according to claim 1, wherein each tensegrity unit has a tensegrity unit geometry, wherein the tensegrity unit geometry is defined by a number and lengths of compression members in the tensegrity unit, a number and lengths of tension members in the tensegrity unit, and orientations of the compression members and tension members, and wherein the tensegrity unit geometry supports propagation of the solitary wave with the specified wave characteristics.

3. The apparatus according to claim 1, wherein the tension members have associated tension member stiffness and tension member prestrain and wherein the tension member stiffness, the tension member prestrain, or the tension member stiffness and tension member prestrain are selected to support propagation of the solitary wave with the specified wave characteristics.

4. The apparatus according to claim 1, wherein each junction element has a junction element mass and each tensegrity unit has a tensegrity unit mass, and wherein the junction element mass, the tensegrity unit mass, or junction element mass and the tensegrity unit mass are selected to support propagation of the solitary wave with the specified wave characteristics.

5. The apparatus according to claim 1, wherein the specific wave characteristics comprise at least one of the following characteristics: wave speed, wave width, and wave amplitude.

6. The apparatus according to claim 1, further comprising one or more sensors coupled to one or more tension members.

7. The apparatus according to claim 3, further comprising one or more prestress adjusting devices coupled to one or more tension members.

8. The apparatus according to claim 1, further comprising one or more piezoelectric layers disposed on one or more junction elements.

9. The apparatus according to claim 1, wherein each tensegrity unit has an adjustable tensegrity unit geometry, wherein the tensegrity unit geometry is defined by a number and lengths of compression members in the tensegrity unit, a number and lengths of tension members in the tensegrity unit, and orientations of the compression members and tension members and wherein the tension members have adjustable tension member prestrain, and wherein configuration of the tensegrity units to support propagation of the solitary wave with the specified wave characteristics comprises adjusting the tensegrity unit geometry, adjusting the tension member prestrain, or adjusting both the tensegrity unit geometry and tension member prestrain.

10. The apparatus according to claim 1, further comprising a structural stability member surrounding the plurality of tensegrity units and the plurality of junction elements.

11. The apparatus according to claim 1, wherein the apparatus is incorporated into a composite material to provide selectable dynamic properties to the composite material.

12. The apparatus according to claim 1, wherein the apparatus is fabricated by rapid prototyping techniques.

13. A method for generating solitary waves with specified characteristics, the method comprising:
- disposing a plurality of tensegrity units, wherein one or more tensegrity units have adjustable parameters;
- disposing one or more junction elements between one or more adjacent tensegrity units;
- receiving one or more incident pulses at an end element coupled to one tensegrity unit; and,
- adjusting the adjustable parameters to generate a solitary wave with the specified characteristics.

14. The method according to claim 13, wherein each tensegrity unit comprises a plurality of compression members and a plurality of tension members connected thereto and wherein the adjustable parameters comprise at least one of the following parameters: geometries of one or more tensegrity units and prestress of one or more compression members.

15. The method according to claim 13, wherein adjusting the adjustable parameters comprises:
- sensing the one or more incident pulses as the one or more incident pulses propagate through one or more tensegrity units, and
- adjusting the adjustable parameters based on the sensed one or more incident pulses.

16. The method according to claim 13, wherein the specified characteristics comprises at least one of the following characteristics: wave speed, wave width, and wave amplitude.

17. The method according to claim 14, wherein the plurality of tensegrity units are arranged in an array of a plurality of chains of tensegrity units and adjusting the adjustable parameters comprises adjusting the prestress of the one or more tension members to generate a plurality of solitary waves with different phases, wherein the different phases are selected to combine the plurality of solitary waves at a focal point in an adjacent host medium.

18. A system for solitary wave generation or detection, the system comprising a solitary wave pulse generator, the solitary wave pulse generator comprising:
- a plurality of tensegrity units, wherein the tensegrity units have tensegrity unit characteristics;
- a plurality of junction elements, wherein the junction elements have junction element masses and wherein one or more junction elements are disposed between adjacent tensegrity units of the plurality of tensegrity units; and,
- an end member coupled to at least one tensegrity unit, the end member configured to receive one or more incident pulses,
- wherein the tensegrity unit characteristics and the junction element masses are selected to generate a solitary wave pulse with specified characteristics.

19. The system according to claim 18, wherein the solitary wave pulse generator further comprises:
- an actuator configured to apply the one or more incident pulses to the end member; and
- a second end member coupled to another tensegrity unit, wherein the second end member is configured to direct pulses out of the solitary wave pulse generator and into a structure to be tested.

20. The system according to claim 19, wherein the system further comprises a solitary wave sensor, wherein the solitary wave sensor comprises:
- a second plurality of second tensegrity units, wherein the second tensegrity units have second tensegrity unit characteristics;
- a second plurality of second junction elements, wherein the second junction elements have second junction element masses and wherein one or more second junction elements are disposed between adjacent tensegrity units of the second plurality of second tensegrity units; and,
- a sensor member coupled to at least one tensegrity unit of the second plurality of second tensegrity units, the sensor member configured to receive a solitary wave to be sensed and is disposed to receive pulses from the structure to be tested,
- wherein the second tensegrity unit characteristics and the second junction element masses are selected to sense a solitary wave having second specified characteristics.

21. The system according to claim 20, further comprising:
- one or more sensing devices disposed within the plurality of tensegrity unit, the second plurality of second tensegrity units, or the plurality of tensegrity unit and the second plurality of second tensegrity units, and
- a computer configured to collect data from the one or more sensing devices and the actuator.

22. The system according to claim 18, wherein the plurality of tensegrity units are arranged in an array of a plurality of chains of tensegrity units generating a plurality of solitary waves, wherein each chain of tensegrity units generates a solitary wave with a different phase from the solitary wave generated by another chain of tensegrity units, wherein the different phases are selected to combine the plurality of solitary waves at a focal point in an adjacent host medium.

* * * * *